(12) United States Patent
Dahman et al.

(10) Patent No.: US 7,099,988 B2
(45) Date of Patent: Aug. 29, 2006

(54) APPARATUS AND METHOD TO READ INFORMATION FROM AN INFORMATION STORAGE MEDIUM

(75) Inventors: Kirby G. Dahman, Tucson, AZ (US); Glen A. Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 10/649,500

(22) Filed: Aug. 26, 2003

(65) Prior Publication Data

US 2005/0050264 A1    Mar. 3, 2005

(51) Int. Cl.
*G06F 12/06* (2006.01)

(52) U.S. Cl. .............................. 711/5; 711/162; 710/5; 707/204

(58) Field of Classification Search ..................... 711/5; 707/204; 710/52
See application file for complete search history.

(56) References Cited

U.S. PATENT DOCUMENTS

| 5,034,914 A | * | 7/1991 | Osterlund | ..................... 710/52 |
| 5,150,473 A | * | 9/1992 | Zulch | .......................... 711/162 |
| 2003/0088591 A1 | * | 5/2003 | Fish | ........................... 707/204 |

* cited by examiner

*Primary Examiner*—Pierre Bataille
*Assistant Examiner*—Lev Iwashko
(74) *Attorney, Agent, or Firm*—Dale F. Regelman

(57) ABSTRACT

A method to read (N) sequential files written to an information storage medium, and then skip the next (M) sequential files. The method initially identifies the (M) files to be skipped. After identifying the (M) files to be skipped, the method reads the (N) files.

15 Claims, 8 Drawing Sheets

FIG. 6 while(not_at_end_of_tape){

READ + N transactions  ~~610

SKIP next + M transactions  ~~620

}

//where N and M are integers

```
while(not_at_end_of_tape){

READ + (N - X) transactions          ~810

LOCATE LOOK AHEAD over next +M transactions  ~820

READ + X transactions                 ~830

SKIP next + M transactions            ~840

}

//where N,M, and X, are integers
```

APPARATUS AND METHOD TO READ INFORMATION FROM AN INFORMATION STORAGE MEDIUM

FIELD OF THE INVENTION

This invention relates to an apparatus and method to read information from an information storage medium. More specifically, the invention relates to reading (N) sequential files written to an information storage medium, and then skipping the next (M) sequential files, wherein the information storage medium is disposed in a data storage device.

BACKGROUND OF THE INVENTION

Automated media storage libraries are known for providing cost effective access to large quantities of stored media. Tape cartridges containing a moveable magnetic tape are often used in automated data storage libraries. Tape media, such a magnetic tape, is a common medium for the storage of data to be utilized by a computer. Magnetic tape has found widespread use as a data storage medium because it provides a relatively inexpensive solution for storing large amounts of data.

Over time, certain information comprising historical files and/or historical logical volumes becomes antiquated and no longer of use. Such historical files are rarely accessed and read. Nevertheless, the information storage media comprising those historical files remain stored and catalogued in a media storage library.

What is desirable is an improvement in the amount of time required to recycle an information storage medium, where that method includes reading and copying one or more sequentially encoded files comprising current information written to the information storage medium, and then skipping over one or more sequentially encoded files comprising historical information written to the information storage medium which is to be abandoned. Thereafter, the information storage medium may be reused to store new information.

SUMMARY OF THE INVENTION

Applicants' invention includes an apparatus and method to read (N) sequential files written to an information storage medium, and then skip the next (M) sequential files, wherein the information storage medium is disposed in a data storage device. By "file," Applicant means a collection of data where that collection of data may or may not include one or more filemarks. In certain embodiments, Applicant's method initially identifies the (M) files to be skipped. After identifying the (M) files to be skipped, the method reads the (N) files.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements.

Figure 1:
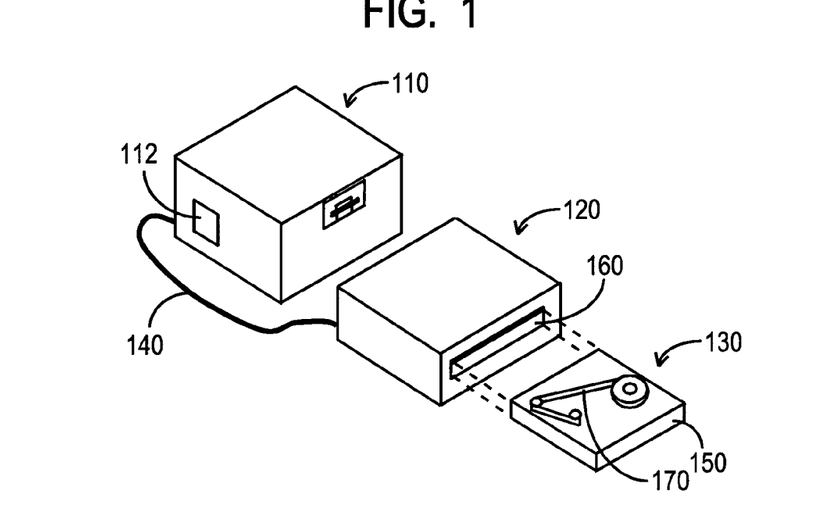
FIG. 1 shows a perspective view of Applicant's data storage system.

A data storage system according to the invention is shown in FIG. 1. This system comprises a data storage device 120 interconnected to a host computer 110 by communication link 140. In certain embodiments, communication link 140 is typically a serial interconnection or parallel communication link, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Host computer 110 comprises a computer system, for example a mainframe computer such as an IBM AS/400, a personal computer such as an IBM Aptiva, a workstation such as an IBM RS/6000, and the like, including an operating system such as Windows, AIX, Unix, MVS, LINUX, etc. (Windows is a registered trademark of Microsoft Corporation; AIX is a registered trademark, and MVS is a registered trademark of, IBM Corporation; and UNIX is a registered trademark in the United States and other countries licensed exclusively through The Open Group.) In certain embodiments, host computer 110 includes a storage management program 112. The storage management program 112 in the host computer 110 may include the functionality of storage management type programs known in the art that manage the transfer of data to a data storage and retrieval system, such as the IBM DFSMS implemented in the IBM MVS operating system.

In certain embodiments, data storage device 120 comprises a tape drive. In certain of these embodiments, Applicant's system further includes an associated tape cartridge 130. The tape drive 120 includes a receiving slot 160 into which the tape cartridge 130 is inserted. The tape cartridge 130 comprises a housing 150 containing a length of magnetic tape 170. Examples of magnetic tape cartridges include a single reel cartridge, such as IBM 3590, Linear Tape Open (LTO), or Digital Linear Tape (DLT), or a dual reel cartridge, such as Travan or IBM 3570.

The tape drive 120 is preferably compatible with the associated host computer, and can assume any one of a variety of cartridge or cassette linear formats. Examples of such tape drives include IBM 3490 tape drive, or LTO, or DLT, or Travan compatible tape drives.

Figure 2:
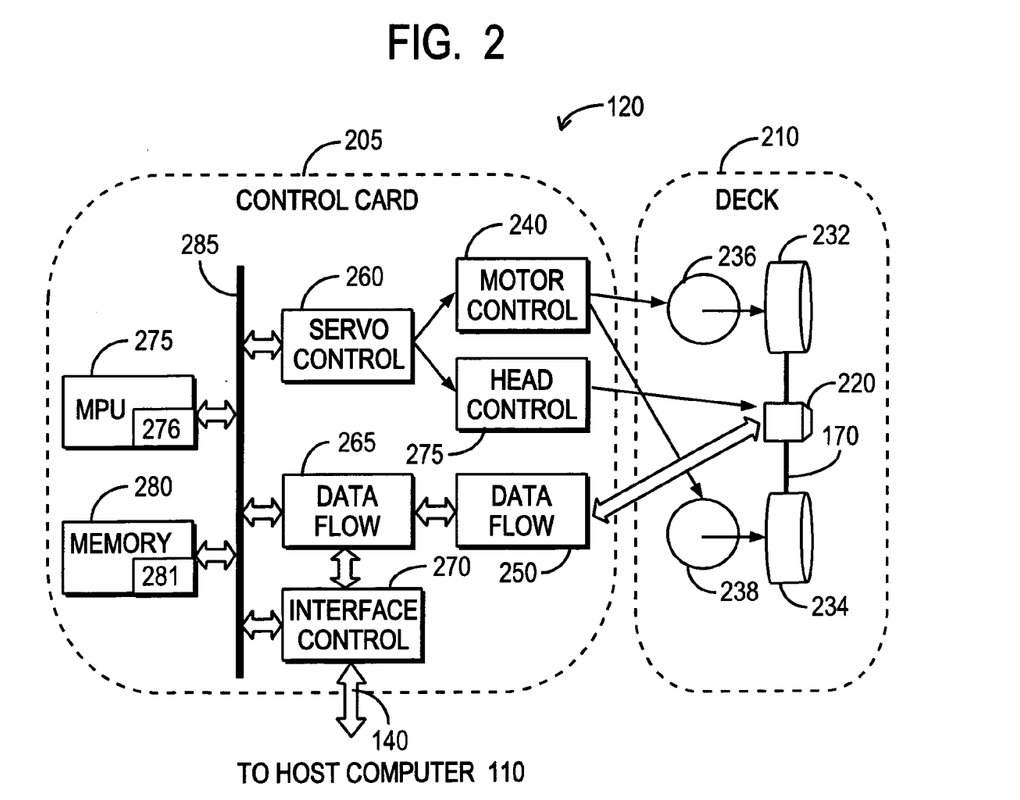
FIG. 2 is a block diagram showing the components of Applicant's data storage device.

FIG. 2 shows one embodiment of tape drive 120. The tape drive 120 of FIG. 2 comprises a deck 210 including movable parts, and a control card 205 including various circuits and buses. The deck 210 includes a head assembly 220 which contacts the tape 170 to read and/or write data thereon, and to read a servo pattern encoded on tape 170. Tape drive 120 further includes motors 236 and 238 for respectively rotating a supply reel 234 and a take-up reel 232. For a tape cartridge 130 of a dual reel type, both of the reels 232 and 234 are included in the tape cartridge 130. For a tape cartridge 130 of a single reel type, however, only the supply reel 234 is included in the tape cartridge 130 while the take-up reel 232 is provided in the tape drive 120. Although not shown in FIG. 2, the deck 210 additionally includes a mechanism for moving the head assembly 220 across the width of the tape 170, a mechanism for holding the inserted tape cartridge, and a mechanism for ejecting the inserted tape cartridge.

Control card 205 includes a microprocessor (MPU) 275 for the overall control of the tape drive 120, a memory 280, a servo control unit 260, a data flow unit 265, and an interface control unit 270, all of which are connected to the MPU 275 via an internal bus 285. MPU 275 includes a computer useable medium, such as computer useable medium 276, having computer readable program code disposed therein to operate a tape drive using the program of FIG. 8.

Control card 205 further includes a motor control unit 240 and a head control unit 245, both of which are interconnected to the servo control unit 260. Control card 205 also includes a data channel unit 250 which is interconnected to the data flow unit 265. Memory 280 is shown as a single hardware component in FIG. 2. In certain embodiments, memory 280 includes a read only memory (ROM) portion comprising a program to be executed by the MPU 275, and a working random access memory (RAM). Memory 280 further includes a computer program product, such as computer program product 281, usable with a programmable computer processor having computer readable program code embodied therein to operate a tape drive using the program of FIG. 8.

The servo control unit 260 manages speed control for the motors 236 and 238 via motor control unit 240, and position control for the head assembly 220, by transmitting the respective control signals to the motor control unit 240 and the head control unit 245. The motor and head control units 240 and 245 respond to these control signals by physically driving the motors 236, 238 and the head assembly 220, respectively.

The data flow unit 265 compresses data to be written on the tape 170, decompresses data read from the tape 170, and corrects errors. Data flow unit 265 is interconnected to the data channel unit 250 and to interface control unit 270. The interface control unit 270 communicates data to/from the host computer 110 via the communication link 140. In certain embodiment, interface control unit comprises a SCSI interface.

The data channel unit 250 comprises a data modulating and demodulating circuit. When data is written to the tape 170, data channel unit 250 modulates and then converts to write currents sent to the write head data received from the data flow unit 265. When data is read from the tape 170, data channel unit 250 performs analog-digital conversion and demodulation for data read by the head assembly 220.

Figure 3:
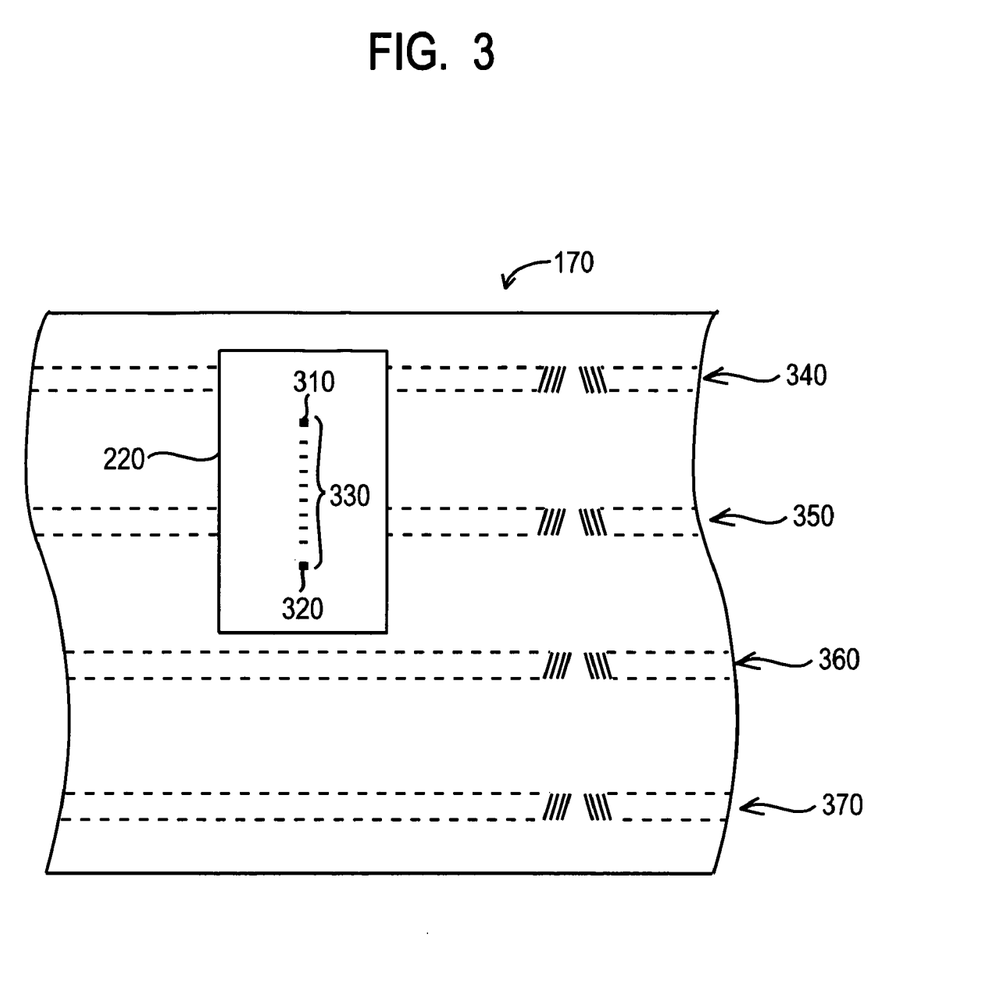
FIG. 3 is block diagram showing a plurality of servo signal patterns encoded on Applicant's tape storage medium.

FIG. 3 illustrates a magnetic tape, such as for example tape 170. Magnetic tape 170 includes plurality of separate longitudinal servo bands 340, 350, 360, and 370, which are mastered onto the magnetic tape when it is manufactured. Tape 170 further includes data tracks in data bands positioned between the servo bands. Tape head 220 typically comprises a number of separate data read and/or write transducers 330, which read and/or write data with respect to a number of parallel data tracks. In the illustrated embodiment of FIG. 3, tape head 220 includes 8 read/write elements. Tape head 220 further includes one or more servo sensors, such as servo sensors 310 and 320, which are offset from the data read and/or write transducers 330, so as to track follow the servo track and thus allow the transducers 330 to be guided along the data track or tracks.

The read and/or write transducers 330 are typically shared between various data tracks or groups of data tracks, and are moved between tracks or groups of tracks in the lateral direction of the tape. Each of the servo bands 340, 350, 360, and 370, provide the servo guidance for a group of data tracks, and the servo heads 310 and 320 of the tape head are repositioned laterally within a servo band to allow the data read and/or write transducers 330 to access different data tracks within a data band, and is repositioned laterally to another servo band to access still further data tracks in another data band.

In one embodiment, the servo bands are spaced apart to span the data tracks, which are located in a data band between the servo bands. This places a servo band close to the corresponding data tracks to reduce the span between the outer read and/or write elements and the servo band, and reduce sensitivity to changes in tape width between the time data is written and read back. To insure that the servo lateral positioning is precise, two servo transducers 310 and 320 may be provided at either end of the tape head, straddling the data read and/or write transducers. The lateral positioning may be obtained from either of the two servo bands, or by averaging or otherwise comparing data from the two servo bands.

Figure 4:
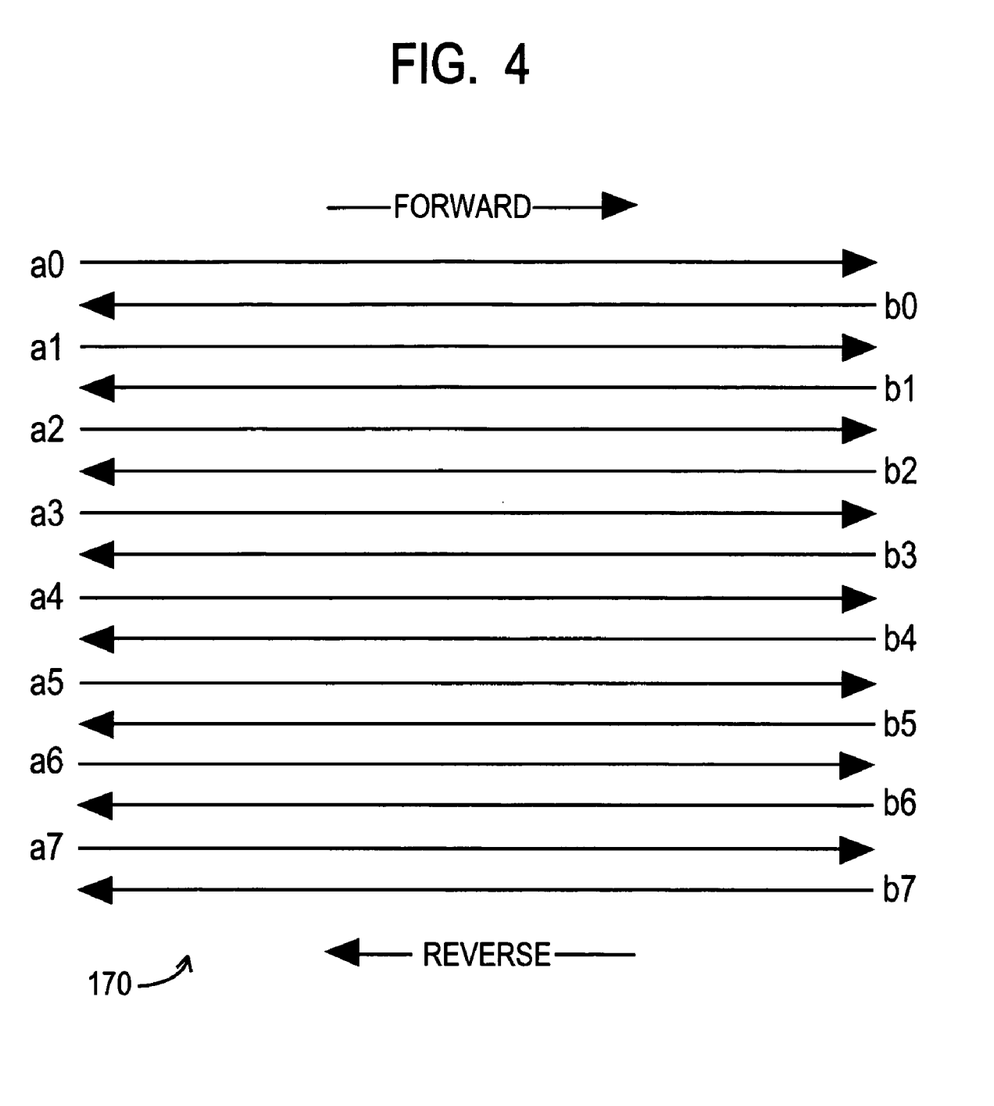
FIG. 4 illustrates interleaved data tracks written to Applicants' information storage medium.

Referring now to FIGS. 2, 3, and 4, first tape reel motor 236 rotates first tape reel 232 in a first direction, i.e. clockwise for example, and in a second direction, i.e. counterclockwise for example. Second tape reel motor 238 rotates second tape reel 234 in a first direction, i.e. clockwise for example, and in a second direction, i.e. counterclockwise for example.

Depending on the direction of rotation, magnetic tape 170 can be moved bi-directionally between first tape reel 232 and second tape reel 234 past tape head 220. Multi-element tape head 220 includes plurality of read/write elements 330 to read from and/or record information to magnetic tape 170. In certain embodiments, tape head 220 includes pairs of read/write elements, where certain elements are utilized to read/write information to tape 170 when tape 170 is moved in a forward direction, and where other read/write elements are used to read/write information to tape 170 when the tape is moved in the reverse direction. In these embodiments, servo control 260 selects the appropriate read/write elements.

FIG. 4 shows a first plurality of data tracks, i.e. a first "wrap," comprising data tracks a0, a1, a2, a3, a4, as, a6, and a7, encoded on tape 170, where that first wrap was written to tape 170 when the tape was moved in the forward direction. As those skilled in the art will appreciate, the 8 data tracks comprising the first wrap can be read by a tape head, such as tape head 220, which includes 8 read/write elements, when tape 170 is moved past tape head 220 in the forward direction.

FIG. 4 further shows a second plurality of data tracks, i.e. a second wrap, comprising data tracks b0, b1, b2, b3, b4, b5, b6, and b7, encoded on tape 170, where that second wrap was written to tape 170 when the tape was moved in the reverse direction. In the illustrated embodiment of FIG. 4, the first wrap and the second wrap are interleaved, and further wraps (not shown in FIG. 4) may in turn be interleaved with these first two wraps continuing a pattern such as a serpentine interleave pattern. As those skilled in the art will appreciate, the second wrap can be read by a tape head, such as tape head 220, which includes 8 read/write elements, when tape 170 is moved past tape head 220 in the reverse direction.

As those skilled in the art will appreciate, over time certain data, i.e. historical data, and certain volumes, i.e. historical volumes comprising that historical data, written to an information storage medium, such as for example tape 170, are superceded with new data and new volumes. Such historical volumes are rarely if ever accessed by host computers. Nonetheless, information storage media comprising those historical volumes remain stored in the data storage and retrieval system.

Figure 5:
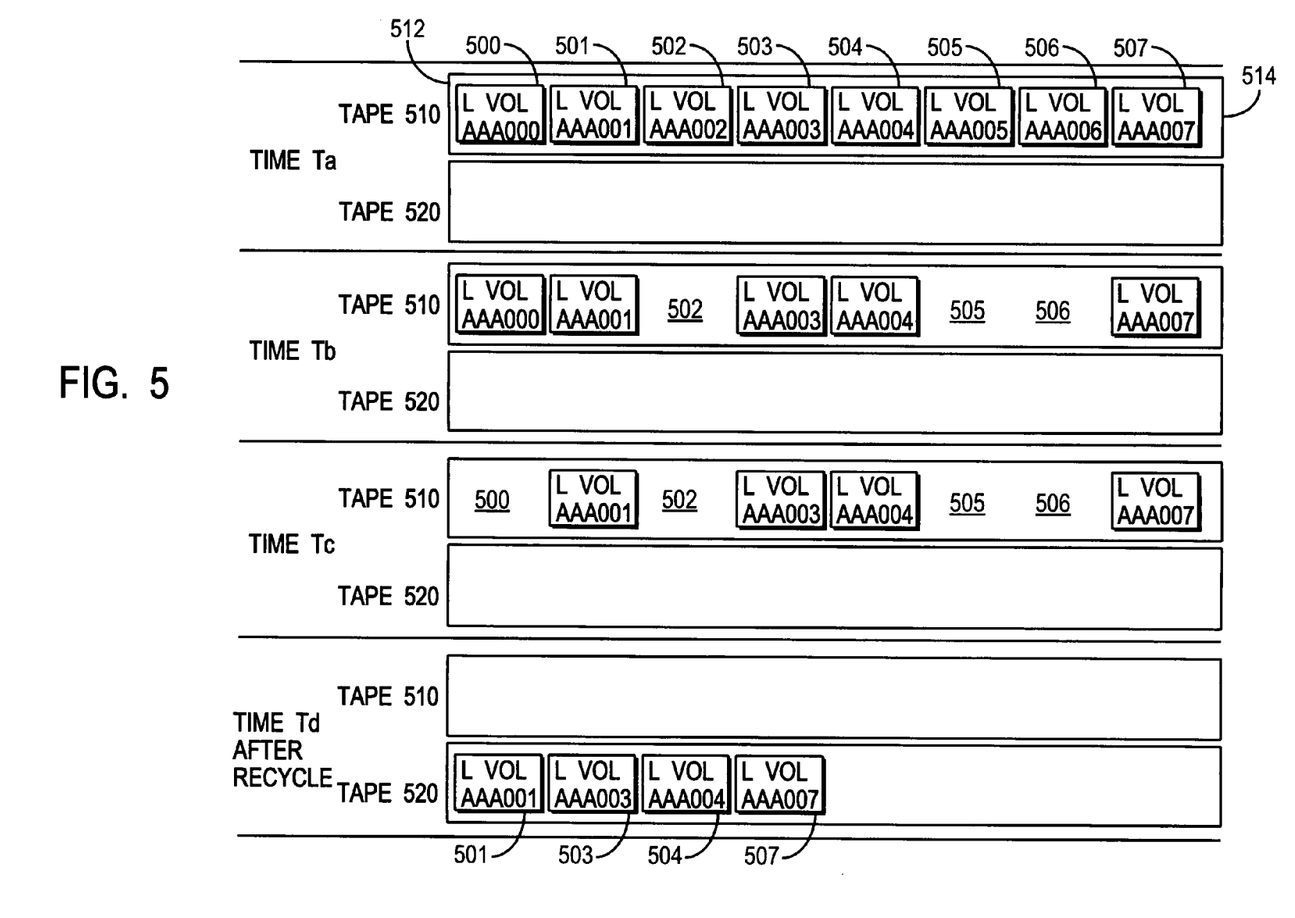
FIG. 5 is block diagram showing current and historical logical volumes written to an information storage medium.

Referring now to FIG. 5, at first time Ta tape 510 comprises a plurality of logical volumes including volumes 500, 501, 502, 503, 504, 505, 506, and 507. For illustrative purposes, FIG. 5 shows tape 510 comprising a beginning of tape ("BOT") 512, eight (8) logical volumes, with logical volume 507 ending at end of tape ("EOT") 514.

In certain embodiments, BOT 512 comprises a physical beginning of the tape medium. In certain other embodiments, BOT 512 comprises a logical beginning of the tape. In certain other embodiments, EOT 514 comprises a physical end of the tape medium. In certain embodiments, EOT of tape 514 comprises a logical end of the tape medium. As those skilled in the art will appreciate, Tape 510 may comprise many thousands of individual files. Tape 520 is empty, i.e. comprises no data at time $T_a$.

At time $T_b$ logical volumes 502, 505, and 506, have been superceded by new volumes written elsewhere, and thus are no longer needed and can be abandoned. Thereafter, at time $T_c$ logical volume 500 has also been superceded.

As those skilled in the art will further appreciate, writing information to a tape storage medium is not a "random access" process. Rather, in order to write new data to a tape medium, a tape drive first locates the end of the existing data, and then commences writing the new data. Therefore, even though volumes 500, 502, 505, and 506, do not contain useful information at time $T_c$, it is generally not practical to overwrite just those superceded volumes with new information.

A "recycling" process selectively copies the logical volumes comprising useable information, i.e. current information such as logical volumes 501, 503, 504, and 507, from tape 510 to tape 520. This recycling process is sometimes referred to as a "reclamation" process.

At time $T_d$, where $T_d$ is subsequent to recycling, volumes 501, 503, 504, and 507, have been copied from tape 510 to tape 520 Thereafter, new data may be written to tape 510 commencing at beginning of tape 512. In certain embodiments, logical volumes 500 through 507, inclusive, are first erased from tape 510. In certain other embodiments, logical volumes 500 through 507, inclusive, are overwritten with new information. In either embodiment, tape 510 is said to have been "recycled." As FIG. 5 shows, the recycling process "reclaims" tape 510 in its entirety while the useful data, i.e. logical volumes 501, 503, 504, and 507, require only a portion of the available storage space on tape 520.

Figure 6:
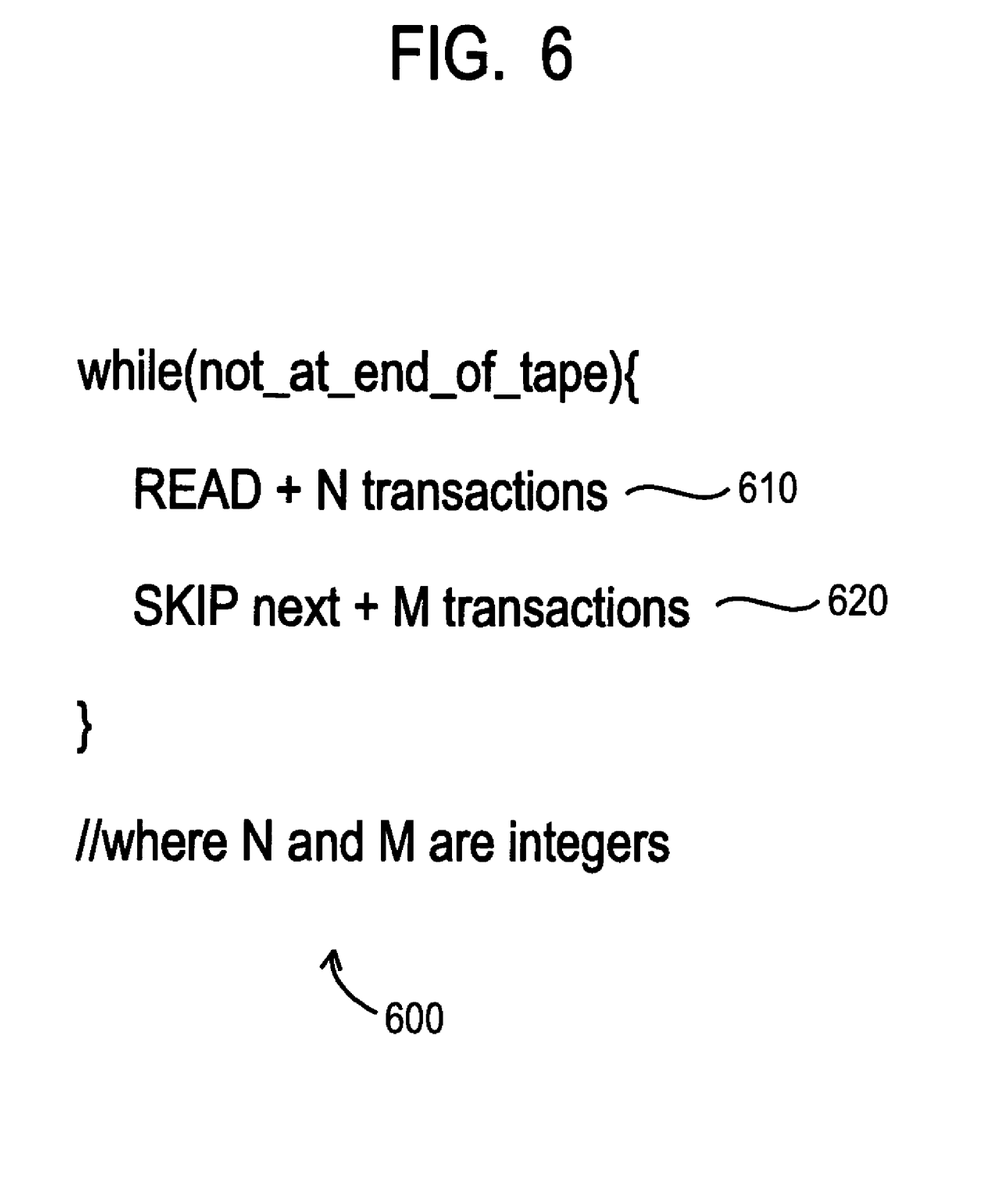
FIG. 6 recites the steps of a prior art method to read (N) files written to an information storage medium and then skip the next (M) files written to that storage medium.

In order to recycle tape 510, current files, i.e. volumes 501, 503, 504, and 507, must be read from tape 510, while the superceded volumes are "skipped." Prior art recycling processes included a series of READ commands interspersed with SKIP commands. FIG. 6 shows one such prior art method.

Referring now to FIGS. 5 and 6, to read logical volumes 503 and 504, and then skip logical volumes 505 and 506, prior art program 600 includes command sets 610 and 620 as follows:

READ +2 transactions (Command Set 610)

SKIP next +2 transactions (Command Set 620)

Command set 610 causes the tape drive to read volumes 503 and 504. Command set 610 comprises a command which needs to be operated on immediately, such that no command complete is generated for a successful completion until all the data requested has been sent. Therefore, command set 620 is not issued to the tape drive until a command complete signal is generated for command set 610. A command complete signal for command set 610 is not generated until the data requested by the READ command has been transferred to the host computer and thus the command is truly complete.

Command set 620 causes the tape drive to skip past the designated number of volumes. In certain embodiments, command set 620 includes a LOCATE command. In certain other embodiments, command set 620 includes a SPACE command. In certain other embodiments, command set 620 includes a READ command for the designated volumes where the data transferred will be discarded.

Figure 7:
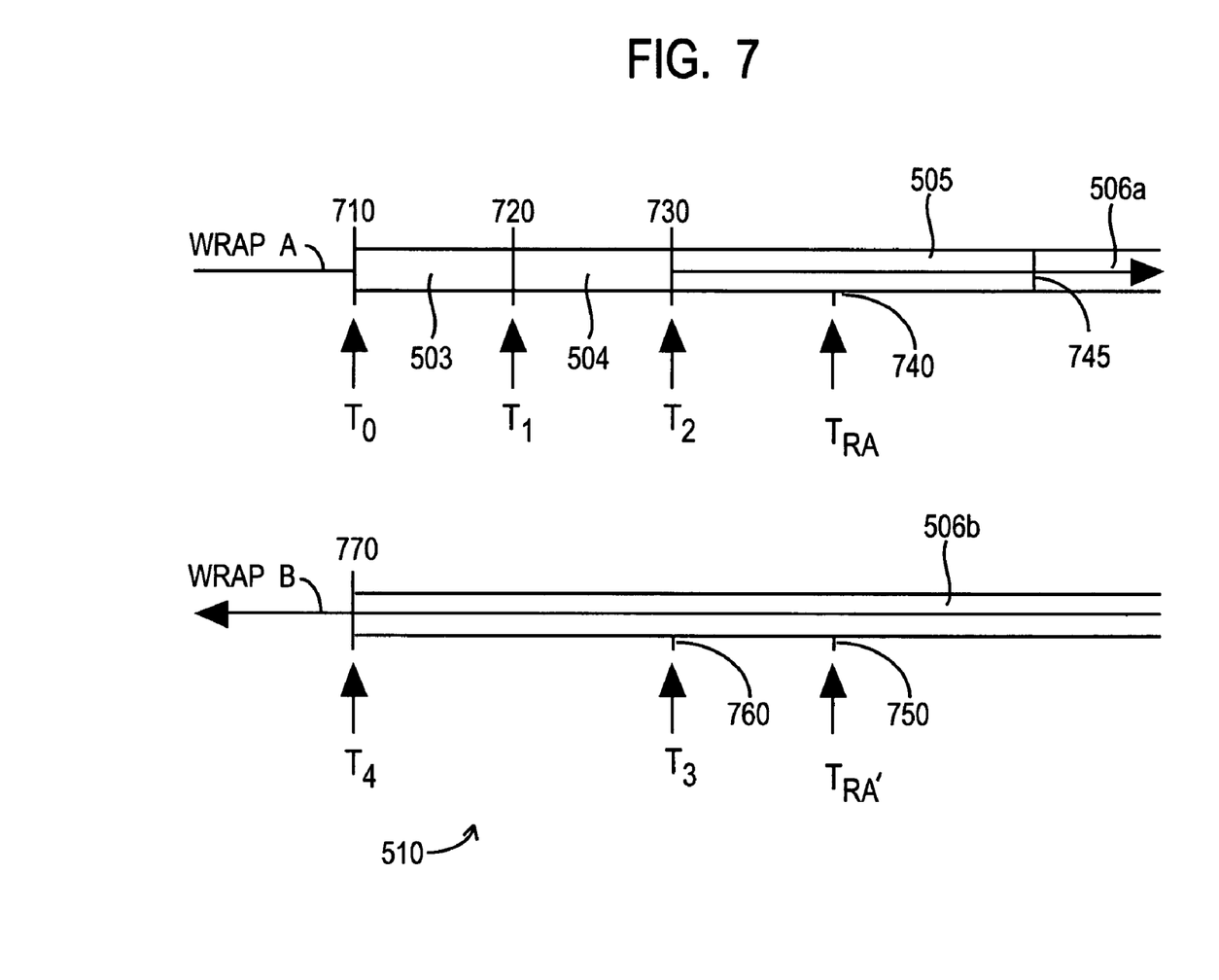
FIG. 7 illustrates the time intervals used to read certain files from an information storage medium.

Referring now to FIGS. 5, 6, and 7, using the prior art method of FIG. 6, the tape head is first positioned at location 710 (FIG. 5) on tape 510. As those skilled in the art will appreciate, location 710 can be determined by the tape drive using various means. In certain embodiments, location 710 is identified using longitudinal position ("LPOS") signals encoded in the servo tracks. In certain embodiments, location 710 is identified using a blockid.

Volumes 503 and 504 are read by the tape head, and data signals are provided to the requesting host computer. Meanwhile, the tape keeps moving and the tape drive "reads ahead" until receiving the next command, i.e. the SKIP command. After a command complete signal is generated with respect to command set 610, the prior art method issues command set 620 which causes the tape drive to skip volumes 505 and 506, and move to the beginning of volume 507. Using such a prior art method, however, can be time inefficient.

In the illustrated embodiment of FIG. 7, logical volumes 503 and 504 are written to a first wrap of tape 510 (FIG. 5). Location 710 comprises the beginning of logical volume 503, location 720 comprises the beginning of volume 504, and location 730 comprises the end of volume 504. The tape drive reaches the end of volume 504, i.e. location 730, at time $T_2$. After the tape drive reaches location 730, a tape drive would typically continue to move the tape and read in the forward direction as the tape drive waits for the next command, i.e. the drive "reads ahead" in the forward direction.

At time $T_{RA}$, the tape drive receives command set 620 to skip logical volumes 505 and 506. Logical volume 505 begins at location 730 and ends at location 745. Logical volume 506 begins at location 745 and ends at location 770 on wrap B. Volume portion 506a is written to wrap A and volume portion 506b is written to wrap B.

At time $T_{RA}$, command set 620 is received, tape movement in the forward direction stops, and the tape head is repositioned laterally to read the second wrap. At time $T_{RA'}$, the tape head is positioned at location 750 along the second wrap and the tape begins moving in the reverse direction. At time $T_3$, the tape head moves past location 760 on wrap B. The tape continues to move in the reverse direction until the tape head is positioned at location 770 on wrap B. The tape head reaches location 770 at time $T_4$.

Because the prior art method does not issue command set 620 until time $T_{RA}$, the identity and location of the files to skip remain unknown to the tape drive in the "waiting interval" comprising the time interval between time $T_2$ and time $T_{RA}$. During this waiting interval, the tape drive "reads ahead," and continues to move the tape in forward direction from location 730 to location 740. Because logical volume 506 is encoded, partially at least, on a reverse wrap, movement of the tape in the forward direction during the waiting interval causes the tape to move in the "wrong" direction with respect to reading logical volume 507 beginning at location 770.

After the tape head is repositioned laterally at time $T_{RA'}$ such that the tape head can read the second wrap, the tape is then moved in the reverse direction. During a "reverse waiting time interval," comprising the time interval between time $T_{RA'}$ and time $T_3$, the tape is moved to location 760.

The prior art method to read logical volumes 503 and 504, skip logical volumes 505 and 506, and then read logical volume 507, using the tape format of FIG. 7 includes an undesirable "waiting time interval" and an undesirable "reverse waiting time interval."

Figure 8:
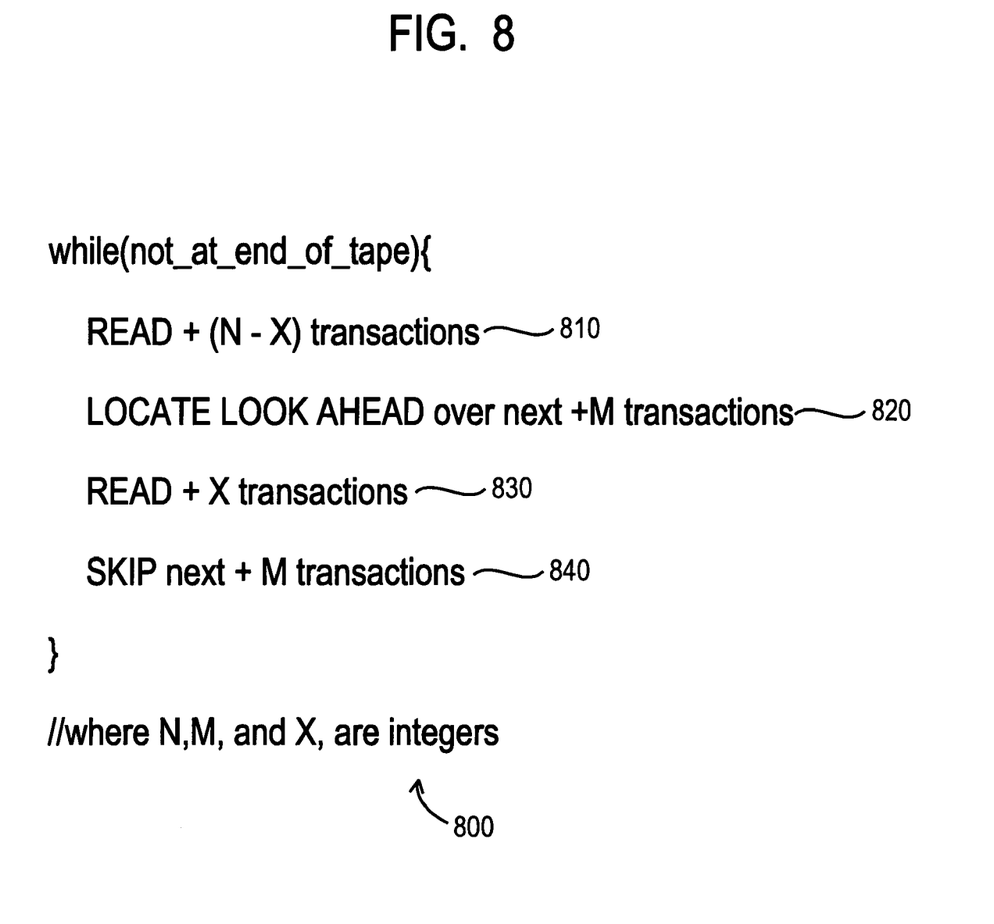
FIG. 8 recites the steps of Applicant's method to read (N) files written to an information storage medium and then skip the next (M) files written to that storage medium.

Referring now to FIG. 8, in certain embodiments Applicant's method includes program 800. In certain embodiments, program 800 includes command set 810, command set 820, command set 830, and command set 840.

In certain embodiments, Applicant's method does not include command set 840. In certain embodiments, command set 820 precedes command set 810. In certain of these embodiments, (N-X) may be 0. In certain embodiments wherein (N-X) is 0, Applicant's method does not include command set 810. In certain embodiments, command set 820 comprises:

LOCATE LOOK AHEAD (Y,M)

where Y comprises the total number of records or filemarks in the (X) volumes so the drive can know when the last data to be read has been read and thus begin the SEEK.

To read logical volumes 503 and 504, then skip logical volumes 505 and 506, using one embodiment of Applicant's method, program 800 reads as follows:

READ +1 transactions (Command Set 810)
LOCATE LOOK AHEAD next +2 transactions (Command Set 820)
READ +1 transaction (Command Set 830)
SKIP next +2 transactions (Command Set 840)

Referring now to FIGS. 5, 7 and 8, using Applicant's method the tape head is positioned at location 710 at time $T_0$. Volume 503 is read in the time interval between time $T_0$ and time $T_1$. Until a command complete signal is received from the host computer, the tape drive continues to "read ahead." Thus, after volume 503 has been read at time $T_1$, the tape continues to move and the tape head continues to read data. When a command complete signal is received regarding reading volume 503, LOCATE LOOK AHEAD command, i.e. command set 820, is issued.

Command set 820 is not an immediate action command. Therefore, once the LOCATE LOOK AHEAD command is logged, i.e. saved in memory, such as memory 280 (FIG. 2), a second command complete signal is issued regarding that LOCATE LOOK AHEAD command. Thus the second command complete signal may rapidly follow the second command being issued, which in turn may rapidly follow the first command complete signal. In certain embodiments, the first command complete signal and the second command complete signal issue prior to time $T_2$. Thereafter, command set 830 immediately issues instructing the tape drive to read volume 504. Because the tape drive "reads ahead" while waiting for the first and second command complete signals, some or all of volume 504 has been read before command set 830 issues. Moreover, before command set 830 issues, the tape drive already knows to skip over volumes 505 and 506 after reading volume 504.

Therefore when using Applicant's method, volumes 503 and 504 are read in the time interval between time $T_0$ and time $T_2$. At time $T_2$, tape movement stops, and the tape head is repositioned to read data encoded on wrap B. At time $T_3$, the tape begins moving in the reverse direction. The tape head is positioned at location 770 at time $T_4$. Volume 507 is read beginning at time $T_4$.

In the embodiment of FIGS. 5 and 7, Applicant's method, as set forth in program 800, is more time efficient than prior art methods. More specifically, Applicant's method eliminates the undesirable "waiting time interval," i.e. interval between time $T_2$ and time $T_{RA}$. In addition, Applicant's method eliminates the undesirable "reverse waiting time interval," i.e. interval between time $T_{RA'}$ and time $T_3$.

Figure 9A:
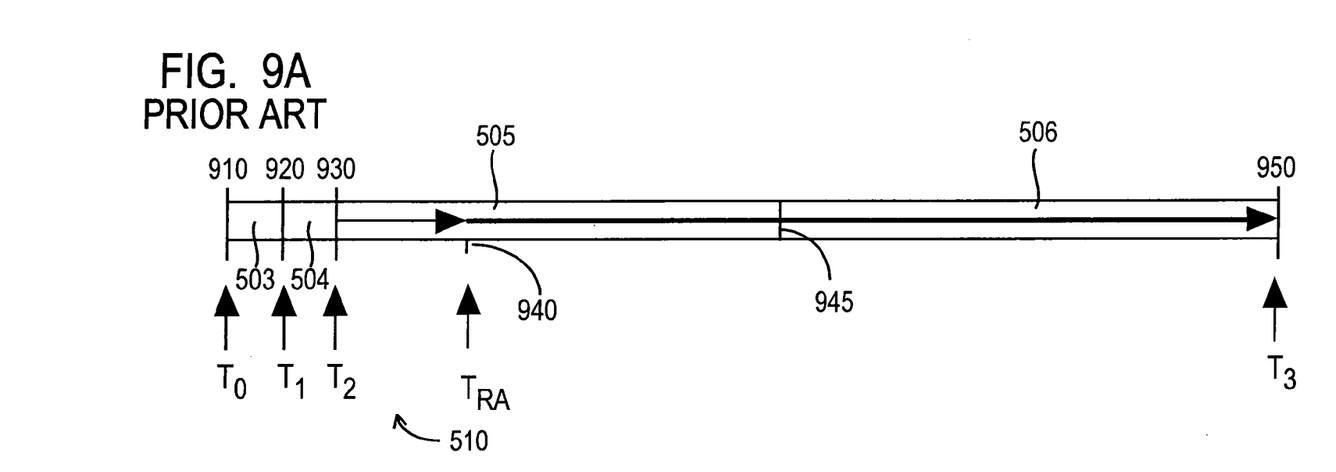
FIG. 9A is a block diagram showing the location of certain files written to Applicant's information storage medium, and certain time intervals used to read certain of those files using prior art methods.
Figure 9B:
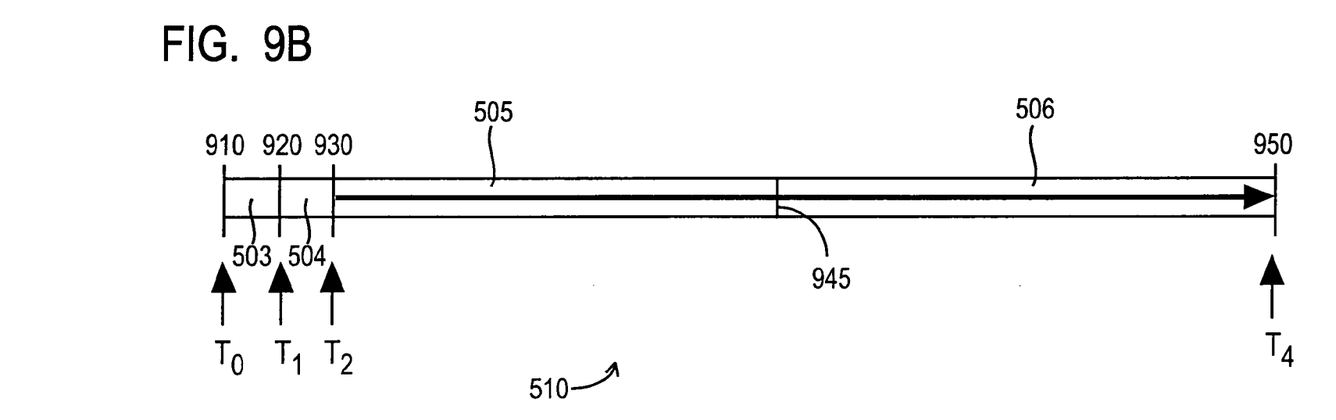
FIG. 9B is a block diagram showing the location of certain files written to Applicant's information storage medium, and certain time intervals used to read certain of those files using Applicant's method.

Applicant's method realizes time efficiencies when compared with prior art methods even if the direction of the tape does not change while reading certain files and skipping other files. Referring now to FIGS. 9A and 9B, in these embodiments logical volumes 503, 504, 505, 506, and 507, are written to tape 510. Location 910 comprises the beginning of logical volume 503, location 920 comprises the beginning of volume 504, location 930 comprises the end of volume 504, and location 950 comprises the beginning of volume 507.

Referring now to FIG. 9A, using the prior art method of FIG. 6 command set 610 includes moving the tape in a first direction at a first speed, reading volumes 503 and 504, and reaching the end of volume 504, i.e. location 930, at time $T_2$. After the tape head reaches location 930, the tape continues to move in the forward direction at the first speed as the tape drive waits for the next command, i.e. the drive "reads ahead" in the first direction.

At time $T_{RA}$, the tape drive receives command set 620 to skip logical volumes 505 and 506. Logical volume 505 begins at location 930 and ends at location 945. Logical volume 506 begins at location 945 and ends at location 950. At time $T_{RA}$, command set 620 issues, the tape drive determines that the distance to from location 940 to location 950 exceeds a predetermined distance threshold, and the tape drive accelerates the tape to a second speed, i.e. the tape drive fast forwards the tape from location 940 to location 950. The tape head reaches location 950 at time $T_3$. Using the prior art method of FIG. 6, the time interval between time $T_2$ and time $T_3$ comprises two intervals, i.e. a first interval between time $T_2$ and time $T_{RA}$ wherein the tape is moved at a read speed, which may comprise one of many different speeds if a drive supports speed matching (i.e. the drive may not be moving the tape at the fastest read speed capable), and a second interval between time $T_{RA}$ and time $T_3$ wherein the tape is moved at a higher speed.

Referring now to FIG. 9B, using Applicant's method of FIG. 8 the tape head is positioned at location 910 at time $T_0$. Volume 503 is read in the time interval between time $T_0$ and time $T_1$. Until a command complete signal is received from the host computer, the tape drive continues to "read ahead." Thus, after completing the read of volume 503 at time $T_1$, the tape continues to move and the tape head continues to read volume 504. When a command complete signal is received regarding reading volume 503, a LOCATE LOOK AHEAD command, i.e. command set 820, is issued.

Command set 820 is not an immediate action command. Therefore, once the LOCATE LOOK AHEAD command is written to the memory disposed in the tape drive, the tape drive provides a second command complete signal.

The second command complete signal may rapidly follow the second command being issued, which in turn may rapidly follow the second command being issued. In certain embodiments, the first command complete signal and the second command complete signal issue prior to time $T_2$. Thereafter, command set 830 immediately issues instructing the tape drive to read volume 504. Because the tape drive has "read ahead," some or all of volume 504 has been read before command set 830 issues. Moreover, before command set 830 issues, the tape drive already knows to skip over volumes 505 and 506 after reading volume 504.

Therefore when using Applicant's method, volumes 503 and 504 are read at a first speed, i.e. at a read speed, in the time interval between time $T_0$ and time $T_2$. At time $T_2$, the tape drive immediately begins to accelerate to fast forward the tape to location 950. The tape head is positioned at location 950 at time $T_4$, wherein the time interval between time $T_2$ and time $T_4$ is less than the time interval between time $T_2$ and time $T_3$ (FIG. 9A).

In the embodiment of FIGS. 5 and 9B, Applicant's method is more time efficient than prior art methods. More specifically, in the embodiment of FIGS. 5 and 9B, Applicant's method eliminates the undesirable "waiting time interval," i.e. interval between time $T_2$ and time $T_{RA}$ wherein the tape drive continues to move the tape at a slow speed. Rather, Applicant's method fast forwards the tape from location 930 to location 950.

Applicant's method described above to read (N) files and then skip the next (M) files may be repeated a plurality of times. During any iteration of the method, the values for (N) and/or (M) may differ from previous or subsequent iterations. For each iteration, the values of (N) and (M) are provided by the requesting host computer.

Applicants' invention further includes an article of manufacture comprising a computer useable medium, such as computer useable medium 276 (FIG. 2), having computer readable program code disposed therein to operate a tape drive using some or all of the steps of FIG. 8.

Applicants' invention further includes a computer program product, such as computer program product 281 (FIG. 2), usable with a programmable computer processor having computer readable program code embodied therein to operate a tape drive using some or all of the steps of FIG. 8.

While the preferred embodiments of the present invention have been illustrated in detail, it should be apparent that modifications and adaptations to those embodiments may occur to one skilled in the art without departing from the scope of the present invention as set forth in the following claims.

We claim:

1. An article of manufacture comprising a computer useable medium having computer readable program code disposed therein to read (N) sequential files written to an information storage medium, and then skip the next (M) sequential files, wherein said information storage medium is disposed in said article of manufacture, the computer readable program code comprising a series of computer readable program steps to effect in the following order:
   reading (N–x) of said (N) files;
   identifying said (M) files;
   reading the remaining (x) files;
   skipping said (M) files;
   wherein (x) is greater than or equal to 1 and less than or equal to (N–1).

2. The article of manufacture of claim 1, wherein said article of manufacture is capable of communicating with a host computer, the computer readable program code further comprising a series of computer readable program steps to effect after reading said (N–x) files:
   providing said (N–x) files to said host computer;
   receiving a first command complete signal from said host computer.

3. The article of manufacture of claim 2, wherein said article of manufacture further comprises a memory, the computer readable program code further comprising a series of computer readable program steps to effect:
   receiving a LOCATE LOOK AHEAD command set from said host computer;
   writing said LOCATE LOOK AHEAD command set to said memory;
   generating a second command complete signal after writing said LOCATE LOOK AHEAD command set to said memory.

4. The article of manufacture of claim 3, the computer readable program code further comprising a series of computer readable program steps to effect receiving a LOCATE LOOK AHEAD (Y,M) command, wherein (Y) comprises the number of filemarks in the (x) files.

5. The article of manufacture of claim 1, wherein said information storage medium comprises a magnetic tape, and wherein said article of manufacture comprises a tape drive comprising a tape head, and wherein said last of said (N) files comprises a file end, the computer readable program code further comprising a series of computer readable program steps to effect:
   moving said magnetic tape in a first direction while identifying said (M) files and reading said (N) files;
   stopping said magnetic tape when said tape head reaches said file end; and
   moving said tape in a second direction while skipping said (M) files, wherein said first direction is opposite said second direction.

6. A method to read (N) sequential files written to an information storage medium, and then skip the next (M) sequential files, wherein said information storage medium is disposed in a data storage device, comprising the following steps in the following order:
   reading (N–x) of said (N) files;
   identifying said (M) files;
   reading the remaining (x) files;
   skipping said (M) files;
   wherein (x) is greater than or equal to 1 and less than or equal to (N–1).

7. The method of claim 6, wherein said data storage device is capable of communicating with a host computer, further comprising, after reading said (N–x) files, the steps of:
   providing said (N–x) files to said host computer;
   receiving said (N–x) files by said host computer after said providing step;

generating a first command complete signal by said host computer after said receiving step.

8. The method of claim 7, wherein said data storage device further comprises a memory, further comprising, after said generating step, the steps of:
issuing a LOCATE LOOK AHEAD command set by said host computer;
receiving said LOCATE LOOK AHEAD command set by said data storage device;
writing said LOCATE LOOK AHEAD command set to said memory;
generating a second command complete signal by said data storage device after said writing step.

9. The method of claim 8, further comprising the step of receiving a LOCATE LOOK AHEAD (Y,M) command, wherein (Y) comprises the number of filemarks in the (x) files.

10. The method of claim 6, wherein said information storage medium comprises a magnetic tape, and wherein said data storage device comprises a tape drive comprising a tape head, and wherein said last of said (N) files comprises a file end, further comprising the steps of:
moving said magnetic tape in a first direction during said identifying step and said reading steps;
stopping said magnetic tape when said tape head reaches said file end; and
moving said tape in a second direction while skipping said (M) files, wherein said first direction is opposite said second direction.

11. A computer program product usable with a programmable computer processor having computer readable program code embodied therein to read (N) sequential files written to an information storage medium, and then skip the next (M) sequential files, wherein said information storage medium is disposed in a data storage device, comprising:
computer readable program code which causes said programmable computer processor to read the first (N−x) of said (N) files;
computer readable program code which causes said programmable computer processor to identify said (M) files after reading said (N−x) files;
computer readable program code which causes said programmable computer processor to read the remaining (x) files after identifying said (M) files;
computer readable program code which causes said programmable computer processor to skip said (M) files after reading said remaining (x) files; wherein (x) is greater than or equal to 1 and less than or equal to (N−1).

12. The computer program product of claim 11, wherein said data storage device is capable of communicating with a host computer, further comprising:
computer readable program code which causes said programmable computer processor to provide said (N−x) files to said host computer after reading said first (N−x) files and before identifying said (M) files;
computer readable program code which causes said programmable computer processor to receive a first command complete signal from said host computer before identifying said (M) files.

13. The computer program product of claim 12, wherein said data storage device further comprises a memory, further comprising:
computer readable program code which causes said programmable computer processor to receive a LOCATE LOOK AHEAD command from said host computer;
computer readable program code which causes said programmable computer processor to write said LOCATE LOOK AHEAD command set to said memory;
computer readable program code which causes said programmable computer processor to receive a second command complete signal after writing said LOCATE LOOK AHEAD command set to said memory and prior to reading said (x) files.

14. The computer program product of claim 11, further comprising computer readable program code which causes said programmable computer processor to receive a LOCATE LOOK AHEAD (Y,M) command, wherein (Y) comprises the number of filemarks in the (x) files.

15. The computer program product of claim 11, wherein said information storage medium comprises a magnetic tape, and wherein said data storage device comprises a tape drive comprising a tape head, and wherein said last of said (N) files comprises a file end, further comprising:
computer readable program code which causes said programmable computer processor to move said magnetic tape in a first direction during while reading said (N−x) files, identifying said (M) files, and reading said remaining (x) files;
computer readable program code which causes said programmable computer processor to stop said magnetic tape when said tape head reaches said file end; and
computer readable program code which causes said programmable computer processor to moving said tape in a second direction while skipping said (M) files;
wherein said second direction is opposite said first direction.

* * * * *